United States Patent
Denk et al.

(10) Patent No.: US 8,064,559 B2
(45) Date of Patent: Nov. 22, 2011

(54) CLOCK CONTROL OF TRANSMISSION-SIGNAL PROCESSING DEVICES IN MOBILE RADIO TERMINAL DEVICES

(75) Inventors: Robert Denk, Grafing (DE); Dietmar Wenzel, München (DE); Robert Würth, München (DE)

(73) Assignee: Infineon Technologies AG, Neubiberg (DE)

( * ) Notice: Subject to any disclaimer, the term of this patent is extended or adjusted under 35 U.S.C. 154(b) by 1026 days.

(21) Appl. No.: 10/503,647

(22) PCT Filed: Feb. 4, 2003

(86) PCT No.: PCT/DE03/00309
§ 371 (c)(1), (2), (4) Date: May 3, 2005

(87) PCT Pub. No.: WO03/067793
PCT Pub. Date: Aug. 14, 2003

(65) Prior Publication Data
US 2005/0201503 A1    Sep. 15, 2005

(30) Foreign Application Priority Data
Feb. 8, 2002    (DE) ................. 102 05 305

(51) Int. Cl.
*H04L 7/00*    (2006.01)
(52) U.S. Cl. ..................... 375/355
(58) Field of Classification Search .......... 375/327, 375/355, 371, 377; 327/140, 50
See application file for complete search history.

(56) References Cited

U.S. PATENT DOCUMENTS

| | | | |
|---|---|---|---|
| 4,460,890 A | | 7/1984 | Busby |
| 5,199,046 A | | 3/1993 | Ling |
| 5,274,372 A | * | 12/1993 | Luthra et al. .............. 341/61 |
| 6,128,357 A | * | 10/2000 | Lu et al. .................. 375/355 |
| 6,362,755 B1 | * | 3/2002 | Tinker .................... 341/61 |

(Continued)

FOREIGN PATENT DOCUMENTS
DE    100 45 547 A1    4/2002

OTHER PUBLICATIONS

XP-002246734, "Rate Conversion for Arbitrary Sampling Rates in the Transmit Path of a Digital Transceiver", Andreas Senst, Gunnar Fock and Heinrich Meyr, Global Telecommunications conference, 2001, Globecom '01, vol. 6, Nov. 25-29, 2001, pp. 3658-3662.

(Continued)

Primary Examiner — Shuwang Liu
Assistant Examiner — Helene Tayong
(74) Attorney, Agent, or Firm — Eschweiler & Associates, LLC

(57) ABSTRACT

To support a plurality of different mobile radio standards in mobile radio terminal devices using a single system oscillator, a sampling rate converter converts the sampling rates from an input rate to an output rate and additionally outputs control information which is suitable for operating signal processing components. The components receiving the control information are arranged in the signal flow upstream of the sampling rate converter, on average exactly at a virtual sampling frequency. The virtual sampling pattern is mapped onto the frame of the physical operating clock by simply gating out edges of the physical operating clock. Using the control signal, a clock control device generates a masked clock that has, on average, an edge repetition rate which corresponds to the virtual sampling frequency of the samples or to an integer multiple thereof.

35 Claims, 4 Drawing Sheets

U.S. PATENT DOCUMENTS

| | | | | |
|---|---|---|---|---|
| 6,476,737 | B1* | 11/2002 | Caroselli et al. | 341/59 |
| 6,563,862 | B1* | 5/2003 | Knutson et al. | 375/219 |
| 6,590,512 | B2* | 7/2003 | Roh et al. | 341/143 |
| 6,621,434 | B2* | 9/2003 | Barry et al. | 341/141 |
| 6,768,430 | B1* | 7/2004 | Weinstein | 341/61 |
| 2001/0045901 | A1* | 11/2001 | Auerbach et al. | 341/123 |
| 2002/0110187 | A1* | 8/2002 | May | 375/222 |
| 2004/0075767 | A1* | 4/2004 | Neuman et al. | 348/506 |
| 2004/0114468 | A1* | 6/2004 | Piirainen | 368/10 |
| 2005/0189978 | A1* | 9/2005 | Truong et al. | 327/259 |

OTHER PUBLICATIONS

XP-002246735, "Chapter 4 Receiver Structure for PAM Signals", Synchronization, Channel Estimation and Signal Processing, 1998, Wiley & Sons, New York, NY, USA, ISBN: 0-471-50275-8, pp. 225-232.

* cited by examiner

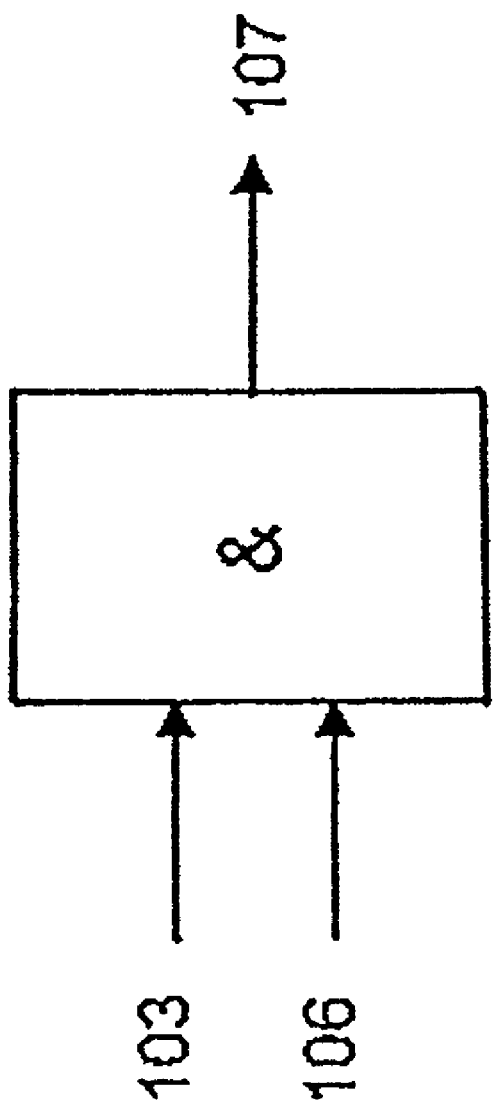

CLOCK CONTROL OF TRANSMISSION-SIGNAL PROCESSING DEVICES IN MOBILE RADIO TERMINAL DEVICES

RELATED APPLICATION

This application is a national stage application of International Application No. PCT/DE03/00309, filed Feb. 4, 2003, which is entitled "CLOCK CONTROL IN TRANSMISSION-SIGNAL PROCESSING DEVICES IN MOBILE RADIO TERMINAL DEVICES", which was not published in English, and claims priority to German Patent Application Serial No. 102 05 305.7, which was filed on Feb. 8, 2002, which is hereby incorporated by reference in its entirety.

FIELD OF THE INVENTION

The present invention relates generally to the field of mobile communication and to the generation of mobile communication transmission signals for different mobile radio standards. In particular, the invention relates in this context to an apparatus and to a method for clock control in transmission-signal processing devices in mobile radio terminal devices such as mobile stations.

BACKGROUND OF THE INVENTION

The GSM standard currently used in mobile communication involves the use of "GSMK" (Gaussian Minimum Shift Keying) Modulation, which uses a signal space having signal points which have a phase difference of 180°. To this end, the packet service GPRS (General Packet Radio Service) has been developed, which allows operation at higher data rates. Another standard currently used is the TIA/EIA-136 (IS 136) standard, which involves the use of a π/4-DQPSK (D-quaternary-PSK) modulation method for generating the transmission signals. To a certain extent as a transitional standard between GSM and GPRS, on the one hand, and UMTS, on the other, the EDGE standard and also the associated EGPRS (enhanced GPRS) packet service have been defined. Although EDGE is a TDMA (Time Division Multiple Access) method, there is already a transition from GMSK modulation to 8-PSK modulation. 8-PSK modulation involves the use of a signal space having 8 signal points, the phase difference between the individual signal points being 45°. By contrast, UMTS uses the CDMA (Code Division Multiple Access) method (also in combination with TDMA and/or FDMA), which involves the signals in any radio link being encrypted using a respective proprietary code, the "spread code".

One general aim is to develop mobile communication appliances which are designed for operation with a plurality of different mobile radio standards and which may accordingly be used in the various mobile radio systems. One problem in this context, however, is the fact that the modulation methods described above are based on different symbol clock frequencies which cannot be converted into one another by integer factors or simple rational ratios. Consequently, at least two different system clocks are normally required which are usually derived from separate crystal oscillators.

Previous transmission apparatuses for combined UMTS and GSM/EDGE applications thus have exclusively a plurality of crystals or PLL (Phase Locked Loop) circuits which supply system clock frequencies precisely co-ordinated with the respective standard which are usually an integer multiple of the inverse symbol period in the transmission method. The architecture of the signal processing lines is rigidly linked to these frequencies. Both the physical operating clock and the physical sampling clock are thus not independent of the standard-specific digital signal processing, particularly the standard-specific symbol period, in these transmission apparatuses.

German patent application DE 100 45 547.6 "Verfahren zur systemunabhangigen digitalen Erzeugung von Mobilkommunikations-Sendesignalen verschiedener Mobilfunkstandards" [Method for system-independent digital generation of mobile communication transmission signals in various mobile radio standards], which is prior art in line with §3(2) of the German Patent Act, describes a related method which, by way of example, is not designed for the specific requirements of the UMTS standard, however, and, in particular, has the property that it not only uses a single crystal oscillator but also makes joint use of the same digital/analog converter (DAC) and other circuit components for a plurality of standards, and also operates the DAC at the same sampling frequency for all of the standards, which is not advantageous for a system which supports the UMTS and GSM/EDGE standards, for example.

SUMMARY OF THE INVENTION

It is thus an object of the present invention to specify a method and an apparatus for clock control in transmission-signal processing devices in mobile radio terminal devices such as mobile stations or base stations which are designed for the demands of as many mobile radio standards as possible and, in particular, are suitable for a system which supports the UMTS and GSM/EDGE standards.

A fundamental concept of the invention is the use of a sampling rate converter which, besides the actual signal conversion, additionally outputs control information which is suitable for operating signal processing components, which are arranged in the signal flow upstream of the sampling rate converter, on average exactly at the virtual sampling frequency, even though the virtual sampling frequency is not necessarily available as the physical operating clock in the apparatus. The sampling rate converter converts the samples provided in the virtual time frame into samples of the physical sampling pattern in the digital/analog converter and outputs a control signal which a clock controller uses to generate a signal which, on average, has an edge repetition rate which corresponds exactly to the virtual sampling frequency, particularly to an integer multiple of the virtual sampling frequency.

In the text below, the terms have the following meanings: "Sampling frequency" is the clock frequency at which the digital/analog converter (DAC) or an analog/digital converter (ADC) is operated or would need to be operated in order to convert a signal from the digital domain into the analog domain (or vice versa), "Sampling rate" is the number of samples of a discrete-time signal per unit time, averaged over a defined period, "Sampling pattern" is the periodic structure containing samples of a discrete-time signal at a defined interval in relation to a freely selectable reference variable (length, time, etc).

The invention permits the advantages below—possibly in connection with developments which are specified in the subclaims.

The transmission apparatus is operated just with a single crystal oscillator or just one system clock which is used for processing signals in all of the supported standards. This system clock or a clock which is derived therefrom by a phase locked loop (PLL) is used as the DAC's physical sampling clock in the transmission path (physical sampling clock). The same clock or another clock derived from the system clock by a phase locked loop or a clock splitter is used as the physical operating clock for the digital circuit components in the transmission path (physical operating clock).

The only demand on the frequency of the physical operating clock in this connection is merely to ensure that, taking into account the available circuit resources, it is fast enough to achieve the necessary computation power for real-time processing. The most important demand on the frequency of the physical sampling clock is merely to ensure that it is high enough to observe the sampling theorem or to achieve a desired oversampling factor.

The clocks derived from the crystal oscillator by any PLLs used are achieved by comparatively simple PLL division factors which permit the PLL to be designed beneficially, but which are not necessarily suited to the additional standard which is to be supported.

The standard-specific digital signal processing (e.g. operations at chip level in the case of UMTS signals) may be based on sampling patterns which are independent of the time frame of the system clock and/or independent of the time frame of the physical operating clock in the digital circuit components and/or independent of the time frame of the physical sampling clock.

The sampling rates or sampling frequencies associated with the sampling patterns, which (sampling rates or sampling frequencies) are crucial to the standard-specific signal processing and depend specifically on the parameters of the mobile radio standard, e.g. chip period duration, symbol period duration etc., do not need to arise physically in the arrangement. They are thus virtual sampling frequencies.

The transmission apparatus contains at least one sampling rate converter, particularly a fractional sampling rate converter (SRC), which converts the virtual sampling pattern into the physical sampling pattern. The sampling rate converter supplies control information which can be used to map the virtual sampling pattern onto the physical operating clock's frame, which is prescribed by the system clock. This flow of control information is in the opposite direction to the signal flow.

The virtual sampling pattern is mapped onto the physical operating clock's frame simply by gating out edges of the physical operating clock ("clock gating"). The rate of the remaining edges of this clock corresponds, on average, precisely to the virtual sampling rate (or to an integer multiple of the virtual sampling rate).

Since the digital circuit components operate using a proprietary physical operating clock which may possibly be chosen to be identical for the two standards, the circuit may have a "synchronous design".

BRIEF DESCRIPTION OF THE DRAWINGS

The invention is explained in more detail below with reference to exemplary embodiments in conjunction with the figures of the drawing, in which:

FIG. 4 shows an embodiment of a clock control device.

DETAILED DESCRIPTION OF THE INVENTION

Figure 1:
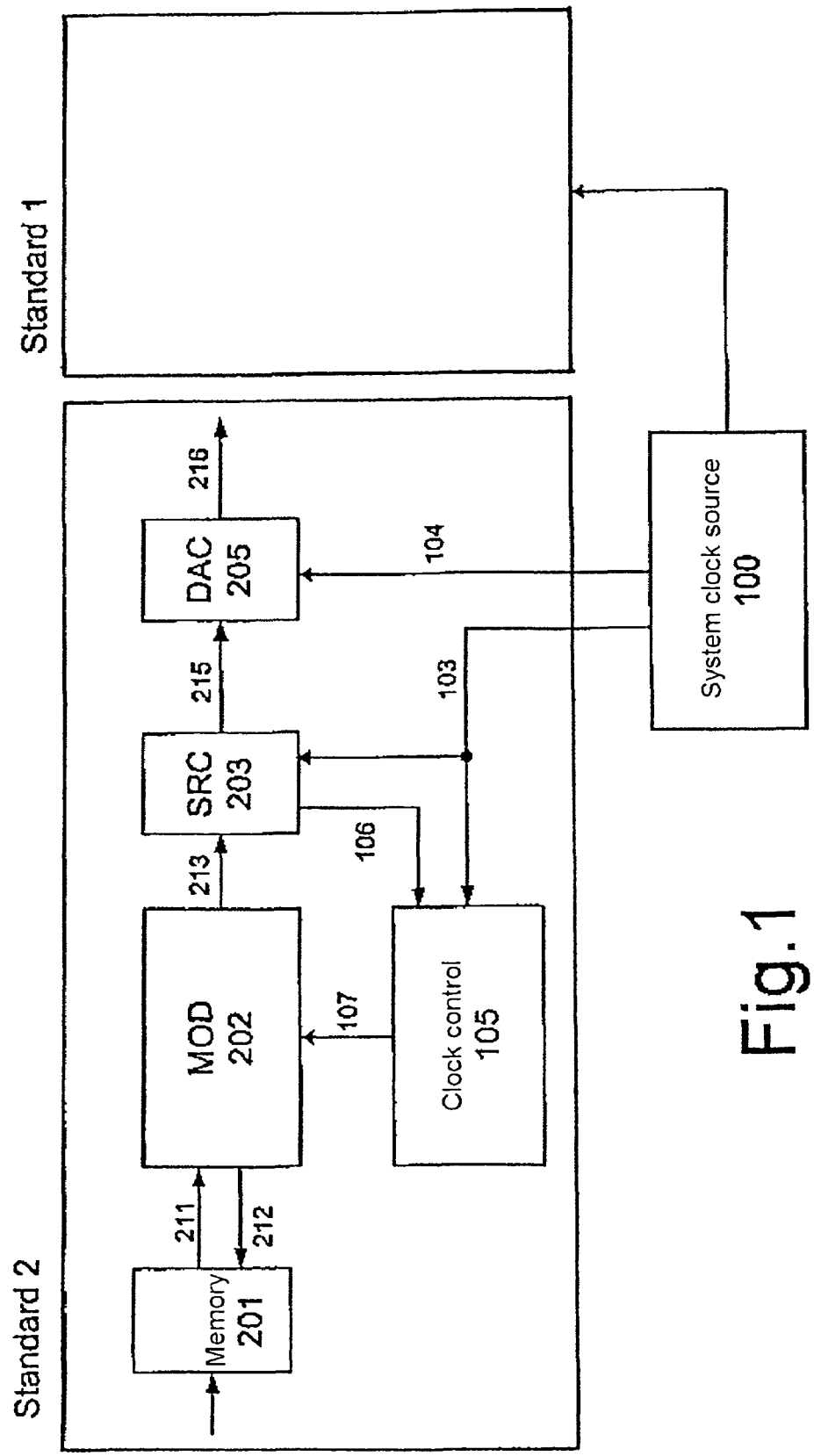
FIG. 1 shows a first embodiment of a transmission apparatus based on the invention.

FIG. 1 schematically shows a general embodiment of an apparatus based on the invention. This apparatus has a system clock source 100 with a single crystal which is used for processing signals in a plurality of standards. The system clock source 100 supplies at least one physical operating clock 103, which in the simplest case is identical to the physical sampling clock 104, which is likewise supplied by the system clock source 100.

In addition, the first embodiment of an apparatus based on the invention as shown in FIG. 1 has a sampling rate converter 203, which accepts samples 213, which are in a virtual sampling pattern, and converts them into samples 215, based on the physical sampling pattern of the digital/analog converter (DAC) 205. The DAC 205 is operated using the physical sampling clock 104 and outputs the analog signal 216 at the output.

In addition, the sampling rate converter 203 operated using the physical operating clock 103 supplies a control signal 106, which is supplied to the input of a clock controller 105 which likewise has the physical operating clock 103 supplied to it. Using the control signal 106, the clock controller 105 generates a masked clock 107, specifically such that the clock 107 has, on average, an edge repetition rate which corresponds exactly to the virtual sampling frequency of the samples 213 or to an integer multiple thereof.

The masked clock 107 is supplied to the modulator 202, the modulator 202 taking input data 211 from the upstream memory 201 in correspondence with the virtual sampling clock using the address and/or control information 212.

On the basis of the flow of control information 106 or 212 in the opposite direction to the signal flow, the SRC 203 uses the control information 106 which it itself has generated to control the number of operating clock cycles per unit time in the preceding signal processing stages 202 and thus ultimately also determines the speed at which the modulation data 211 are read from the memory 201. The memory 201 or a control unit associated therewith can request further data from the preceding data source before the memory 201 becomes empty. This backwardly directed chain-like flow of control means that the data throughput of the transmission path is determined exclusively by the physical sampling clock 104 of the DAC and the conversion ratio of the SRC 203, but not by the physical operating clock 103 in the signal processing stages.

The flexibility of the inventive arrangement with regard to the choice of system clock allows the crystal oscillator and/or the PLL to be chosen to suit the properties and demands of the first standard in order to simplify matters, with it merely being necessary to ensure that a computation power which is adequate for the second standard can thus also be attained. No consideration needs to be given to the standard-specific symbol period from the second standard, however, which is a very significant advantage when producing a clock design for circuit implementation. In this case, the block for supporting the first standard normally does not require a sampling rate converter.

Figure 2:
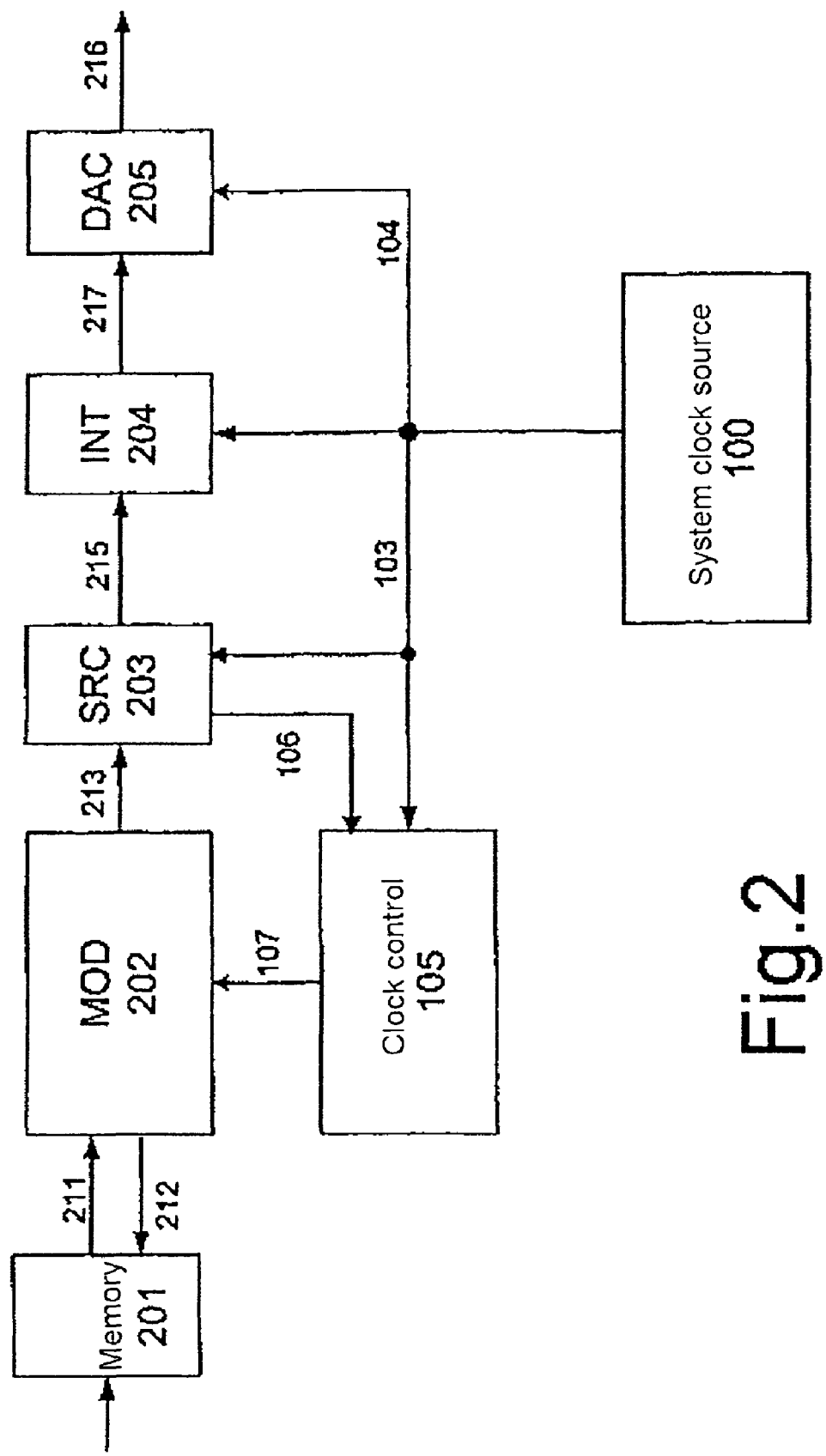
FIG. 2 shows a second embodiment of a transmission apparatus based on the invention.

The arrangement shown in FIG. 1 additionally has the following special features:
a) The physical operating clock 103 and the physical sampling clock 104 may differ from one another; by way of example, the clock frequency of the operating clock 103 can be chosen as an integer multiple of that of the sampling clock 104 in order to achieve better utilization of the circuit components of the modulator 202 and/or of the sampling rate converter 203 through time division multiplexing.

b) It is frequently desirable to operate the DAC 205 at a much higher sampling frequency than the signal bandwidth so as to have to use just one comparatively simple reconstruction low pass filter for obtaining the analog signal 216 as a result of this high oversampling ratio. To keep down the computation complexity and hence also the circuit complexity in the modulator 202 and, in particular, in the sampling rate converter 203, however, i.e. to use a sampling pattern therein for the signals 213 and 215 which is aligned with the signal bandwidth, it is advantageous in this case to use an interpolator 204 with a fixed integer conversion ratio upstream of the DAC 205, as shown in FIG. 2.

c) One particular advantage is that cases a) and b) can be combined if, in case b), the high oversampling ratio means that the high-frequency sampling clock 104 is also used as a physical operating clock 103 and, at the same time, use is made of the advantage from case a) to subject circuit components (adders, multipliers, . . . ) to time division multiplexing.

Figure 3:
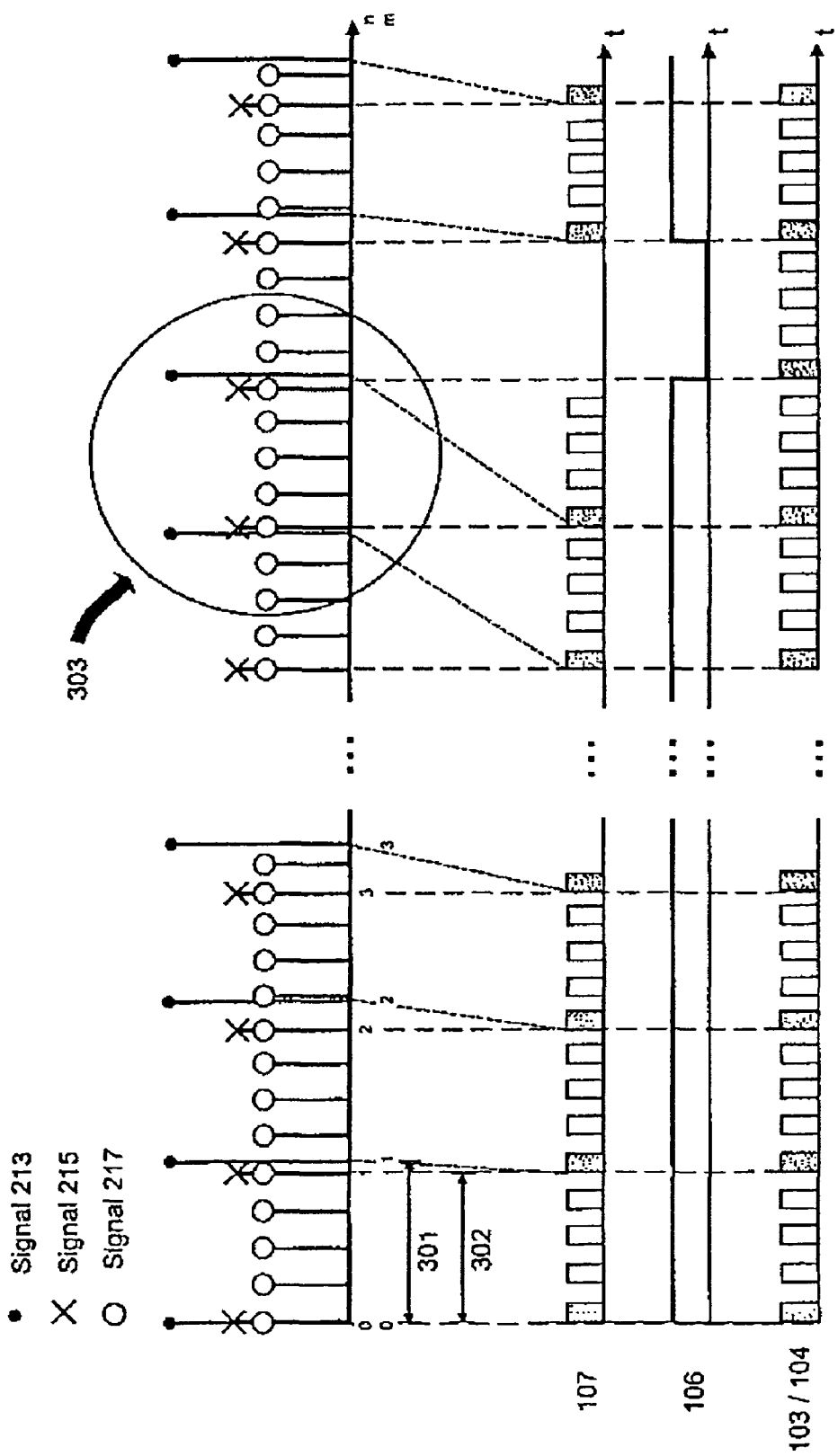
FIG. 3 shows a timing diagram to illustrate the various signal profiles.

FIG. 3 shows the relationship between the physical operating clock 103 or the physical sampling clock 104 and the masked operating clock 107 and also the relationship between the virtual sampling pattern and the sampling pattern at the output of the sampling rate converter 203 and the physical sampling pattern of the DAC 205.

In line with the refinement according to section c) above, the frequency of the sampling clock 104 or of the operating clock 103 in the present exemplary embodiment is four times the output rate of the sampling rate converter 203, specifically 65 MHz or 62.4 MHz, in particular. The interpolator 204 accordingly has the interpolation factor 4. The two frequencies can be derived from rational multiples of the GSM/EDGE-typical system frequency of 13 MHz (factor 5 or 192/40), which corresponds to 48 times the inverse symbol period of a GSM/EDGE symbol. In this case, the sampling rate converter 203 has a conversion ratio from the input to the output of 64/65 or 1.536/1.625. In both variants, this results in a virtual sampling frequency for the signal 213 of 15.36 MHz, which corresponds exactly to four times the UMTS-typical inverse symbol period (3.84 MHz) and corresponds to the output rate from the modulator 202, which is normally designed for an oversampling factor of 4.

As FIG. 3 shows, the sampling rate converter outputs a sample 215 upon every fourth clock edge of the operating clock 103 (index n). To calculate each output value, there are thus four operating clock cycles available which can be used for subjecting circuit resources to time division multiplexing. Similarly, FIG. 3 shows the samples of the input signal 213, from which the sampling rate converter 203 calculates the samples of the output signal 215, in the virtual sampling pattern (index m). The samples 213 on the input side are transferred to the sampling rate converter 203 at the times of the rising edges of the marked pulses of the masked clock 107.

In this case too, it can be seen that a value needs to be generated by the modulator 202 only upon every fourth operating clock cycle at first, i.e. the modulator 202 can also be operated using a multiplex factor of 4.

Since the virtual sampling pattern 301 has somewhat longer periods than the output-side sampling pattern 302 of the converter 203, situations (303) arise in which a further output value 215 needs to be calculated without a new input value 213 being provided. This is taken into account by the sampling rate converter 203 by virtue of it deactivating the control signal 106 for the period of four successive operating clock cycles. If the physical operating clock 103 is subjected to logic ANDing with the control signal 106 in the clock control device 105 as shown in FIG. 4, then what is obtained is precisely the masked operating clock 107 which stops the modulator 202 at exactly the times at which no new sample is required at the input of the sampling rate converter 203. Hence, the modulator 202 is automatically stopped just often enough for it to output the samples exactly at the virtual sampling rate on average.

On account of its being actuated using the masked clock 107, the modulator 202 may advantageously be implemented in terms of signal processing parameters, such as filter coefficients etc., as though it were supplying exactly at the virtual sampling frequency. If the virtual and output-side sampling frequencies in the sampling rate converter 203 differ only slightly, as is the case in the present exemplary embodiment (15.36 MHz and 15.6 MHz), then the situation (303) occurs only relatively rarely, i.e. the modulator 202 is stopped only comparatively rarely and the computation power available in terms of circuitry is used almost completely.

The modulator 202 itself likewise operates using the oversampling factor 4, which means that, considering the multiplex factor 4, it takes a value 211 from the memory 201, under the control of the signal 212, upon every 16th rising edge of the masked operating clock 107. The modulator 202 and hence ultimately the sampling rate converter 203 thus determine the average read speed in the memory 201. If the memory 201 is being monitored by a filling level regulator, then the memory 201 can be filled with new modulation data promptly. This propagates the flow of control information, which ultimately regulates the data rate for transmission.

The invention claimed is:

1. An apparatus for clock control in transmission-signal processing devices in mobile radio terminal devices which is compatible with a plurality of different mobile radio standards, comprising:

a sampling rate converter, a digital/analog converter and a clock control device, wherein the sampling rate converter converts samples provided in a virtual time frame corresponding to a virtual sampling frequency into samples of a physical sampling pattern or an integer fraction thereof for input into the digital/analog converter, and wherein the sampling rate converter outputs a control signal which the clock control device uses to generate a signal which, on average, has an edge repetition rate which corresponds to the virtual sampling frequency or an integer multiple of the virtual sampling frequency, and wherein the signal generated by using the control signal is formed in the clock control device by gating out edges from a physical operating clock, and wherein the signal formed in the clock control device is configured to control a number of operating clock cycles per unit time to dictate a speed in which modulation data is read from a memory.

2. The apparatus as claimed in claim 1, comprising a system clock source comprising a single system clock oscillator.

3. The apparatus as claimed in claim 2, wherein the system clock source supplies the physical operating clock for signal processing components associated with the apparatus, and also a physical sampling clock for the digital/analog converter.

4. The apparatus as claimed in claim 3, wherein the physical operating clock is identical to the physical sampling clock.

5. The apparatus as claimed in claim 3, wherein the physical operating clock comprises an integer multiple of the physical sampling clock.

6. The apparatus as claimed in claim 3, wherein the physical operating clock is derived from a GSM/EDGE-typical system frequency of 13 MHz, wherein the physical operating clock frequency is 65 MHz=5×13 MHz or 62.4 MHz=192/40×13 MHz.

7. The apparatus as claimed in claim 1, wherein the signal generated using the control signal in the clock control device is derived from the physical operating clock and has synchronous edges with respect thereto.

8. The apparatus as claimed in claim 1, wherein the signal generated using the control signal in the clock control is used as an operating clock for circuit components arranged upstream of the sampling rate converter.

9. The apparatus as claimed in claim 1,
wherein a conversion ratio of the sampling rate converter is alterable or programmable.

10. The apparatus as claimed in claim 1, wherein the mobile radio standards comprise the UMTS and GSM/EDGE standards.

11. The apparatus as claimed in claim 1, wherein a conversion ratio of the sampling rate converter is 64/65 or 1.536/1.625 from an input rate to an output rate.

12. The apparatus as claimed in claim 3, wherein a time frame of the physical sampling clock in the digital/analog converter or the time frame of a system clock or the time frame of the physical operating clock is chosen independently of a sampling pattern for the standard-specific digital signal processing.

13. An apparatus for clock control in transmission-signal processing devices in mobile radio terminal devices which is compatible with a plurality of different mobile radio standards, comprising:
a sampling rate converter, a digital/analog converter and a clock control device, wherein the sampling rate converter converts samples provided in a virtual time frame corresponding to a virtual sampling frequency into samples of a physical sampling pattern or an integer fraction thereof for input into the digital/analog converter, and
wherein the sampling rate converter outputs a control signal which the clock control device uses to generate a signal which, on average, has an edge repetition rate which corresponds to the virtual sampling frequency or an integer multiple of the virtual sampling frequency, and
wherein the signal generated by using the control signal is formed in the clock control device by gating out edges from a physical operating clock,
wherein the signal generated using the control signal in the clock control device is derived from the physical operating clock and has synchronous edges with respect thereto, and
wherein the output signal from the clock control device is generated by gating out edges from the physical operating clock by logic ANDing of the physical operating clock and the control signal.

14. An apparatus for clock control in transmission-signal processing devices in mobile radio terminal devices which is compatible with a plurality of different mobile radio standards, comprising:
a sampling rate converter, a digital/analog converter and a clock control device, wherein the sampling rate converter converts samples provided in a virtual time frame corresponding to a virtual sampling frequency into samples of a physical sampling pattern or an integer fraction thereof for input into the digital/analog converter, and
wherein the sampling rate converter outputs a control signal which the clock control device uses to generate a signal which, on average, has an edge repetition rate which corresponds to the virtual sampling frequency or an integer multiple of the virtual sampling frequency, and
wherein the signal generated by using the control signal is formed in the clock control device by gating out edges from a physical operating clock,
wherein a control signal flow determining data throughput is in an opposite direction to a flow of data, wherein the sampling clock associated with the digital/analog converter and a conversion ratio of the sampling rate converter determine a data throughput of a transmission path.

15. An apparatus for clock control in transmission-signal processing devices in mobile radio terminal devices which is compatible with a plurality of different mobile radio standards, comprising:
a sampling rate converter, a digital/analog converter and a clock control device, wherein the sampling rate converter converts samples provided in a virtual time frame corresponding to a virtual sampling frequency into samples of a physical sampling pattern or an integer fraction thereof for input into the digital/analog converter, and
wherein the sampling rate converter outputs a control signal which the clock control device uses to generate a signal which, on average, has an edge repetition rate which corresponds to the virtual sampling frequency or an integer multiple of the virtual sampling frequency, and
wherein the signal generated by using the control signal is formed in the clock control device by gating out edges from a physical operating clock,
wherein the sampling rate converter and the digital/analog converter have an interpolator interposed therebetween with an integer interpolation factor associated therewith.

16. The apparatus as claimed in claim 15, wherein the interpolation factor is identical to a multiplex factor which is used to operate circuit components associated with the sampling rate converter and of the devices arranged upstream thereof.

17. A method for clock control in transmission-signal processing devices in mobile radio terminal devices which is compatible with a plurality of different mobile radio standards, comprising:
generating a control signal from a sampling rate converter, the control signal being used to generate a clock signal which, on average, has an edge repetition rate which corresponds to a virtual sampling frequency;
wherein generating the clock signal comprises gating out edges from a physical operating clock;
converting samples provided in a virtual time frame into samples of a physical sampling pattern for digital/analog conversion; and
using the clock signal to control a number of operating clock cycles per unit time to dictate a speed in which modulation data is read from a memory.

18. The method as claimed in claim 17, further comprising generating a system clock with a system clock source comprising a single system clock oscillator.

19. The method as claimed in claim 18, further comprising supplying a physical operating clock for signal processing components and also a physical sampling clock for the digital/analog conversion.

20. The method as claimed in claim 19, wherein the physical operating clock is identical to the physical sampling clock.

21. The method as claimed in claim 19, wherein the physical operating clock is an integer multiple of the physical sampling clock.

22. A method for clock control in transmission-signal processing devices in mobile radio terminal devices which is compatible with a plurality of different mobile radio standards, comprising:
   generating a control signal from a sampling rate converter, the control signal being used to generate a clock signal which, on average, has an edge repetition rate which corresponds to a virtual sampling frequency;
   wherein generating the clock signal comprises gating out edges from a physical operating clock, and wherein generating the clock signal using the control signal comprises deriving the clock signal from the physical operating clock; and
   converting samples provided in a virtual time frame into samples of a physical sampling pattern for digital/analog conversion,
   wherein generating the clock signal comprises logic ANDing of the physical operating clock and of the control signal.

23. The method as claimed in claim 17, further comprising using the clock signal as an operating clock for circuit components which are arranged upstream of a sampling rate converter used for converting the samples.

24. The method as claimed in claim 17, wherein a conversion ratio for a sampling rate conversion is alterable or programmable.

25. The method as claimed in claim 17, wherein the method is applied for a combination of the UMTS and GSM/EDGE standards.

26. The method as claimed in claim 17, wherein a conversion ratio for the sampling rate conversion is 64/65 or 1.536/1.625 from an input rate to an output rate.

27. A method for clock control in transmission-signal processing devices in mobile radio terminal devices which is compatible with a plurality of different mobile radio standards, comprising:
   generating a control signal from a sampling rate converter, the control signal being used to generate a clock signal which, on average, has an edge repetition rate which corresponds to a virtual sampling frequency;
   wherein generating the clock signal comprises gating out edges from a physical operating clock; and
   converting samples provided in a virtual time frame into samples of a physical sampling pattern for digital/analog conversion;
   generating a system clock with a system clock source comprising a single system clock oscillator; and
   supplying a physical operating clock for signal processing components and also a physical sampling clock for the digital/analog conversion,
   wherein a time frame of the supplied physical sampling clock for the digital/analog conversion or a time frame of the system clock or a time frame of the supplied physical operating clock is independent of a sampling pattern for the standard-specific digital signal processing.

28. The method as claimed in claim 22, wherein generating the clock signal comprises logic ANDing of the physical operating clock and of the control signal.

29. A method for clock control in transmission-signal processing devices in mobile radio terminal devices which is compatible with a plurality of different mobile radio standards, comprising:
   generating a control signal from a sampling rate converter, the control signal being used to generate a clock signal which, on average, has an edge repetition rate which corresponds to a virtual sampling frequency;
   wherein generating the clock signal comprises gating out edges from a physical operating clock; and
   converting samples provided in a virtual time frame into samples of a physical sampling pattern for digital/analog conversion,
   wherein a control signal flow determining a data throughput is in an opposite direction to a signal flow, wherein the sampling clock for the digital/analog conversion and a conversion ratio for a sampling rate conversion determine the data throughput of a transmission path.

30. A method for clock control in transmission-signal processing devices in mobile radio terminal devices which is compatible with a plurality of different mobile radio standards, comprising:
   generating a control signal from a sampling rate converter, the control signal being used to generate a clock signal which, on average, has an edge repetition rate which corresponds to a virtual sampling frequency;
   wherein generating the clock signal comprises gating out edges from a physical operating clock;
   converting samples provided in a virtual time frame into samples of a physical sampling pattern for digital/analog conversion; and
   interpolating using an integer interpolation factor between a conversion of a sampling rate using a sampling rate converter and a sampling rate of the digital/analog conversion.

31. The method as claimed in claim 30, wherein an interpolation factor of the interpolation is identical to a multiplex factor which is used to operate circuit components for sampling rate conversion and devices arranged upstream thereof.

32. An apparatus for clock control in transmission-signal processing devices in mobile radio terminal devices which is compatible with a plurality of different mobile radio standards, comprising:
   a sampling rate converter, a digital/analog converter, a modulator and a clock control device, wherein
   the sampling rate converter converts samples provided in a virtual time frame corresponding to a virtual sampling frequency into samples of a physical sampling pattern or an integer fraction thereof for input into the digital/analog converter, and wherein
   the sampling rate converter outputs a control signal which the clock control device uses to generate a signal which, on average, has an edge repetition rate which corresponds to the virtual sampling frequency or an integer multiple of the virtual sampling frequency, and
   wherein the signal generated by using the control signal is output to the modulator and
   wherein the signal formed in the clock control device is configured to control a number of operating clock cycles per unit time to dictate a speed in which modulation data is read from a memory.

33. An apparatus for clock control in transmission-signal processing devices in mobile radio terminal devices which is compatible with a plurality of different mobile radio standards, comprising:
   a sampling rate converter, a digital/analog converter, a modulator and a clock control device, wherein the sampling rate converter converts samples provided in a virtual time frame corresponding to a virtual sampling frequency into samples of a physical sampling pattern or an integer fraction thereof for input into the digital/analog converter, and wherein the sampling rate converter outputs a control signal which the clock control device uses to generate a signal which, on average, has an edge repetition rate which corresponds to the virtual sampling frequency or an integer multiple of the virtual sampling frequency, wherein the sampling rate converter deactivates the control signal when a further output value needs to be calculated without a new input value being provided, and wherein the signal formed in the clock control device is configured to control a number of operating clock cycles per unit time to dictate a speed in which modulation data is read from a memory.

34. An apparatus for clock control in transmission-signal processing devices in mobile radio terminal devices which is compatible with a plurality of different mobile radio standards, comprising:

a sampling rate converter, a digital/analog converter, a modulator and a clock control device, wherein the sampling rate converter converts samples provided in a virtual time frame corresponding to a virtual sampling frequency into samples of a physical sampling pattern or an integer fraction thereof for input into the digital/analog converter, and wherein the sampling rate converter outputs a control signal which the clock control device uses to generate a signal which, on average, has an edge repetition rate which corresponds to the virtual sampling frequency or an integer multiple of the virtual sampling frequency, wherein the sampling rate converter deactivates the control signal after it establishes that it is necessary to calculate a further output value and there is no pattern element in the virtual sampling pattern situated between two successive clock cycles of the physical sampling pattern and wherein the signal formed in the clock control device is configured to control a number of operating clock cycles per unit time to dictate a speed in which modulation data is read from a memory.

35. An apparatus for clock control in transmission-signal processing devices in mobile radio terminal devices which is compatible with a plurality of different mobile radio standards, comprising:

a sampling rate converter configured to convert samples provided in a virtual time frame corresponding to a virtual sampling frequency into samples of a physical sampling pattern or an integer fraction thereof, and further configured to output a control signal;

a digital/analog converter configured to receive the samples of the physical sampling pattern or the integer fraction thereof; and a clock control device configured to generate a signal by using the control signal and by gating out edges from a physical operating clock, wherein the signal, on average, has an edge repetition rate which corresponds to the virtual sampling frequency or an integer multiple of the virtual sampling frequency and wherein the signal formed in the clock control device is configured to control a number of operating clock cycles per unit time to dictate a speed in which modulation data is read from a memory.

* * * * *